R. H. PYLE.
LUBRICATING MECHANISM.
APPLICATION FILED DEC. 13, 1915.

1,180,879.

Patented Apr. 25, 1916.

WITNESSES:
C. C. Horner
J. H. Wills

INVENTOR
ROBERT H. PYLE

BY
Lockwood & Lockwood
ATTORNEYS

UNITED STATES PATENT OFFICE.

ROBERT H. PYLE, OF INDIANAPOLIS, INDIANA, ASSIGNOR OF ONE-HALF TO ARTHUR R. BAXTER, OF INDIANAPOLIS, INDIANA.

LUBRICATING MECHANISM.

1,180,879. Specification of Letters Patent. Patented Apr. 25, 1916.

Application filed December 13, 1915. Serial No. 66,605.

*To all whom it may concern:*

Be it known that I, ROBERT H. PYLE, a citizen of the United States, and a resident of Indianapolis, county of Marion, and State of Indiana, have invented a certain new and useful Lubricating Mechanism; and I do hereby declare that the following is a full, clear, and exact description thereof, reference being had to the accompanying drawings, in which like letters refer to like parts.

The object of this invention is to provide a lubricating mechanism for oiling the bearings of a shaft or the like, whereby oil may be constantly fed to said bearings by means operated by said shaft. The principal feature of the invention consists in a double conical member secured around the shaft and having a chain thereon adapted to extend into an oil reservoir so that as the shaft rotates, the chain will rotate, thereby constantly elevating the oil and feeding it on said conical member. A certain portion of the oil will remain on the surface of the conical distributing member by capillary attraction and gradually work its way to the end of said member by means of centrifugal force, where it will fly off into the bearings in such a way as to keep them properly oiled.

The full nature of the invention will be understood from the accompanying drawings and the following description and claims.

Figure 1:
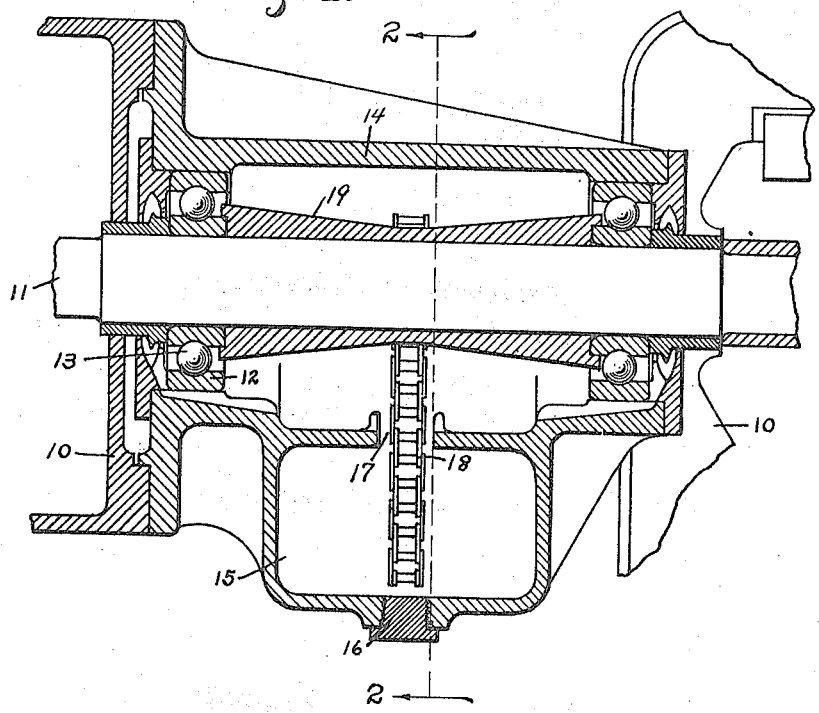
Figure 2:
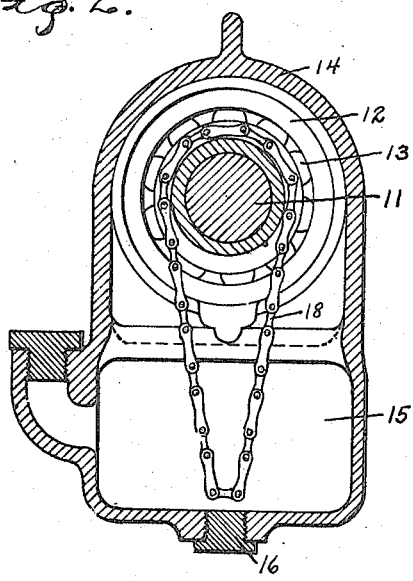

In the drawings, Figure 1 is a vertical cross section through the center of the mechanism. Fig. 2 is a cross section on the line 2—2 of Fig. 1.

In the drawings, there is shown a frame or mounting 10 having a shaft 11 extending therethrough adapted to revolve between the bearings 12 on the ball bearings 13. Between the frame members of the mounting there is a housing 14 having an oil reservoir 15 in the lower portion thereof, said reservoir having an outlet 16 through which the oil may be removed and the reservoir cleaned. The upper portion of the reservoir is provided with an opening 17 through which an endless chain 18 passes.

Around the shaft 11 there is a double conical oil distributer 19 extending from bearing to bearing and tapering inwardly toward its center where it has a cylindrical surface the width of the chain 18, said chain being adapted to ride around said distributer so as to feed oil thereon.

When the shaft is rotated, the chain 18 will be operated through the reservoir and passing over the distributer 19 will supply it with oil. A certain amount of oil will be retained on the surface of the distributer by capillary attraction, while the centrifugal force exerted by the rotation of the shaft will cause it to move gradually up the incline to the end of the distributer where it will enter the bearings and keep them properly oiled.

The invention claimed is:

1. A lubricating mechanism including a mounting, bearings in said mounting, a shaft mounted on said bearings, an oil reservoir, and means on said shaft for feeding oil to said bearings.

2. A lubricating mechanism including a mounting, bearings in said mounting, a shaft mounted on said bearings, an oil reservoir, a conical member keyed to said shaft and extending to said bearings, and means on said member for feeding oil to the surface thereof whereby oil will be fed to said bearing from said member by centrifugal force.

3. A lubricating mechanism including a mounting, bearings in said mounting, a shaft mounted on said bearings, an oil reservoir, a member surrounding said shaft and extending to the bearings, and means for feeding oil from the reservoir to said member whereby oil will be fed to said bearings from said member by centrifugal force.

4. A lubricating mechanism including a mounting, bearings in said mounting, a shaft mounted on said bearings, an oil reservoir, a double conical member secured to said shaft and extending to said bearings, said member tapering inwardly toward its center, and means for feeding oil from the reservoir to said member, whereby it will be fed to said bearings from said member by centrifugal force.

5. A lubricating mechanism including a mounting, bearings in said mounting, a shaft mounted on said bearings, an oil reservoir, a double conical member keyed to said shaft and extending to said bearings, said member tapering inwardly toward its center, and an endless chain passing around said member and extending into said reservoir for feeding oil thereto whereby oil will be fed to said bearings from said member by centrifugal force.

6. A lubricating mechanism including a mounting, bearings in said mounting, a shaft mounted on said bearings, an oil reservoir, a distributing member secured to said shaft and extending to said bearings, and an endless chain passing around said member and extending into said reservoir for feeding oil thereto whereby the oil will be fed to said bearings from said member by centrifugal force.

7. A lubricating mechanism including a mounting, bearings in said mounting, a shaft mounted on said bearings, an oil reservoir, a conical oil distributing member secured to said shaft and extending to said bearings, said member tapering away from said bearings, and an endless chain passing around said member and extending into said oil reservoir for feeding oil thereto whereby the oil will be fed to said bearings from said member by centrifugal force.

In witness whereof I have hereunto affixed my signature.

ROBERT H. PYLE.